(12) United States Patent
Hickman

(10) Patent No.: US 9,958,094 B2
(45) Date of Patent: May 1, 2018

(54) METHOD AND SYSTEM FOR TIGHTENING THREADED ELEMENTS AND CERTIFYING THE CONNECTIONS AND THE DEVICES FOR CONNECTING THREADED ELEMENTS

(71) Applicant: Don Darrell Hickman, Williston, ND (US)

(72) Inventor: Don Darrell Hickman, Williston, ND (US)

( * ) Notice: Subject to any disclaimer, the term of this patent is extended or adjusted under 35 U.S.C. 154(b) by 775 days.

(21) Appl. No.: 14/055,655

(22) Filed: Oct. 16, 2013

(65) Prior Publication Data

US 2014/0103641 A1     Apr. 17, 2014

Related U.S. Application Data

(60) Provisional application No. 61/714,648, filed on Oct. 16, 2012.

(51) Int. Cl.
*F16L 15/00* (2006.01)
*F16L 15/08* (2006.01)
(52) U.S. Cl.
CPC ........... *F16L 15/08* (2013.01); *F16L 2201/10* (2013.01)

(58) Field of Classification Search
CPC .. F16L 15/08; F16L 2201/10; Y10T 29/49826
See application file for complete search history.

(56) References Cited

U.S. PATENT DOCUMENTS

| 4,703,492 | A | * | 10/1987 | Sekiguchi et al. | ............... 373/91 |
| 6,144,891 | A | * | 11/2000 | Murakami et al. | ........... 700/108 |
| 6,212,763 | B1 | | 4/2001 | Newman | |
| 6,758,095 | B2 | | 7/2004 | Newman | |
| 7,006,920 | B2 | * | 2/2006 | Newman et al. | ................. 702/6 |
| 7,519,508 | B2 | | 4/2009 | Newman | |
| 7,631,563 | B2 | | 12/2009 | Newman | |

* cited by examiner

Primary Examiner — Richard Chang
(74) Attorney, Agent, or Firm — Merchant & Gould P.C.

(57) ABSTRACT

A method and system certifies a joint between a first threaded element having a first shoulder and a second threaded element having a second shoulder and the equipment used to tighten the connection. The method tightens to a first position at which the first shoulder abuts the second shoulder. Marks are made that are aligned across the first element and the second element corresponding to the first position. The connection is loosened and then tightened to a second position complying with a predetermined tightening specification. The distance beyond the marks for the first position is measured to verify that it is within acceptable tolerances. If acceptable the connection and/or the tightening equipment can be certified.

10 Claims, 6 Drawing Sheets

Front

Top

METHOD AND SYSTEM FOR TIGHTENING THREADED ELEMENTS AND CERTIFYING THE CONNECTIONS AND THE DEVICES FOR CONNECTING THREADED ELEMENTS

BACKGROUND OF THE INVENTION

Field of the Invention

The present invention relates to a method and system for tightening threaded elements and to certifying that the connections and the device making the connections meet predetermined specifications.

Description of the Prior Art

Tubing, rods and other elements are utilized with drilling and at well sites for oil well applications. A string of such elements are formed by threadably connecting the ends together. It can be appreciated that for deep drilling situations, a large number of these elements must be threadably connected. It can also be appreciated that the stresses placed upon the elements can be quite high and increases as the depth and number of elements grows. When connections experience failures, the damage can extend throughout the well and may be difficult or even impossible to repair. Moreover, associated delays and downtime increase costs associated with the connection failures. Therefore, it is important to achieve proper tightness to ensure that the elements are reliably connected in a manner that will not fail.

To connect such elements, a tong and an associated backup device are utilized in which one of the elements is held by the backup while the tong rotates the other element to either tighten or loosen the threaded connection. By controlling the tong, the amount of torque applied to the connection can be controlled so that a properly tightened connection is made that complies with its specifications.

Past methods of ensuring that the elements and their connections comply with their particular specifications include marking the two elements and then tightening until the elements have been rotated within a predetermined distance range beyond the marking. Although such techniques generally ensure that the connection will be within specifications, the manual technique provides little useful information.

It can be seen that a new and improved method should be utilized that automatically brings the elements together to a predetermined non-torqued relation, records the relative position, and after the elements are loosened, provides specified torque for determining whether the connection parameters are within the predetermined tolerances. Moreover, an improved technique and system would provide for automatically measuring the tightness and determining whether the connection meets specifications and certifying that it does meet specifications or providing an alarm if the connection is not satisfactory. Such a system should also provide for storing relevant data so that the different connections can be monitored and include alarms if connections are not compliant and must be replaced or if worn, damaged or if trending toward a non-compliant connection. The present invention addresses these as well as other problems associated with tightening and certifying threaded connections for elements used with oil wells.

SUMMARY OF THE INVENTION

The present invention is directed to a system and method for certifying connections for rods, tubing or similar elements used in the oil well industry and calibrating and certifying the equipment making the connections. Such rods or tubing elements are long, cylindrical elements that have threaded connections to form a string of elements inserting into the well. One end of each element typically includes a threaded male connector while an opposite end includes a complementary threaded female connector. The elements also include shoulders that abut one another when the elements are threadably connected.

A connection system includes a power tong and a backup. An air brake controls rotation of the tong and torque applied. Loads are sensed by a load pin. A controller records, stores and/or displays various torque and movement variables and outputs. The controller automatically graphs parameters related to the connection of each of the elements. The information may also be transmitted to a remote location for monitoring and analysis. Such a testing and certification system also includes a hydraulic supply system to actuate the tong.

The method of certification includes setup of the tong and load pin and a measurement of the length of the moment arm to calibrate the tong system. Moreover, the type, size, model, serial number and/or other characteristics of the elements being connected and the acceptable ranges may also be entered into the controller. After the various system components have been calibrated, the threaded portions of the elements are cleaned to remove defects and other impurities. The female connector and the male connector are then hand tightened until the shoulders abut one another. Markings are made that are aligned across the ends of the elements at the hand tightened position extending across the junction from the male connector onto the female connector. This position is also automatically recorded by the test equipment. The threaded elements are loosened and the system then retightens the elements with a specified torque. The markings are then compared to a distance specified and a gauge may also be utilized to aid in determining whether the distances between the marks fall within the specified ranges. If the connection meets its specifications, the connection is verified and certified. The connecting and tightening equipment may also be certified. The information relating to the test equipment and the makeup of the joint is stored for analysis. If the comparison following the application of torque does not fall within specifications, the elements may be loosened again and then hand tightened again. Marks may again be made across the first and second shoulders. Following a second loosening and application of torque, a comparison is again made. If the relative alignment falls within specifications, the connection may be verified and information recorded. However, if the connection still does not meet specifications, a further test may be conducted or the certification system may indicate a failed connection or that the equipment making the connecting needs to be adjusted. The number of iterations of the torque application for verification may be varied before a failed connection is indicated.

The controller processes numerous pieces of information and can record the history of each of the elements and the joints to monitor various characteristics and for determining whether one or both of the connected elements must be discarded and replaced if certification is not achieved. The system also provides a history and comparison so that various connections may be monitored to determine predict failure rates and expected useful life. The controller may also include an alarm should the connection not pass. The certification steps are fully automated and controlled by the controller.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring to the drawings, wherein like reference letters and numerals indicate corresponding structure throughout the several views.

DETAILED DESCRIPTION OF THE PREFERRED EMBODIMENT

Figure 1:
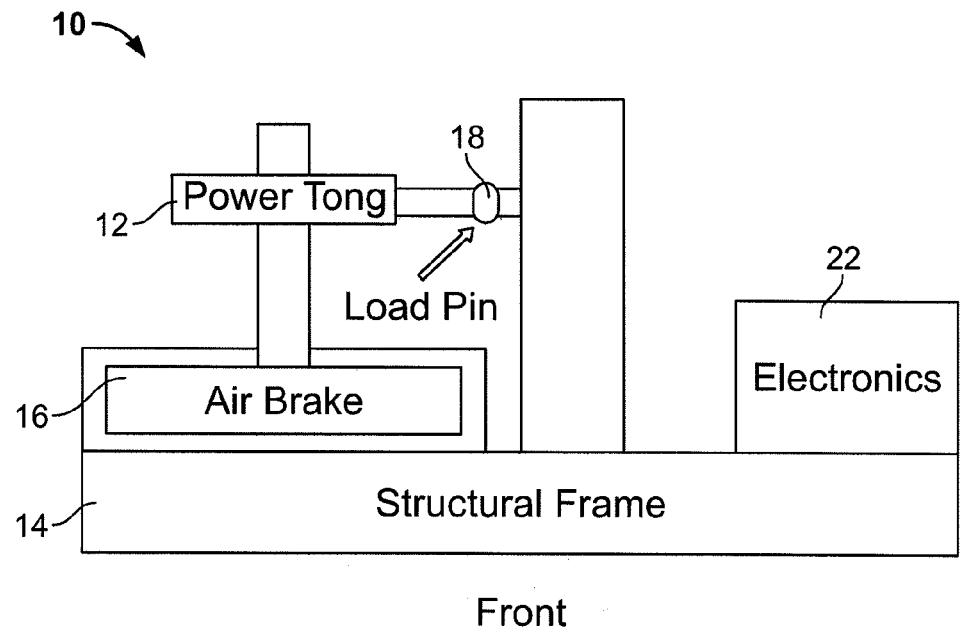
FIG. 1 is a front diagrammatic view of a testing and certifying system for tightened joints according to the principles of the present invention.
Figure 2:
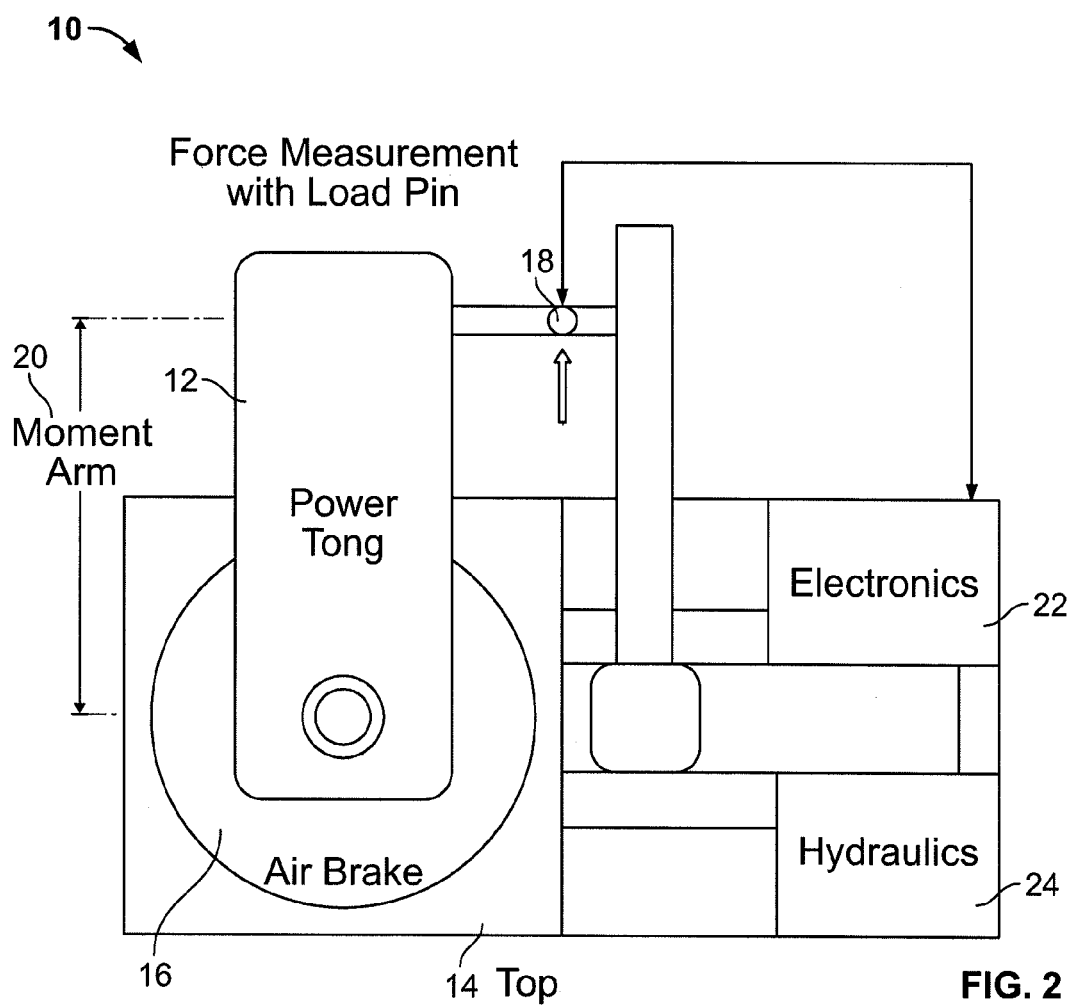
FIG. 2 is a top diagrammatic view of the testing and certifying system for tightening joints shown in FIG. 1.

Referring now to the drawings, and in particular to FIGS. 1 and 2, there is shown a system for certifying tightening equipment and the tightness of connections between threaded joints of tubing or rod elements, generally designated 10. Such a tightening certification system 10 is for use with a power tong 12 mounted on a frame 14. Precision rotation of the power tong 12 is controlled by an airbrake 16. The tong 12 creates a moment arm 20 and measurement of the torque created is sensed by a load pin 18. The system 10 includes an electronics control system 22 and a hydraulics system 24 for actuating the tong 12 and the airbrake 16. The method for tightening the rods or tubing together and certifying that the tightening equipment and the connection meet specifications is shown in FIG. 3, as discussed hereinafter.

Figure 4:
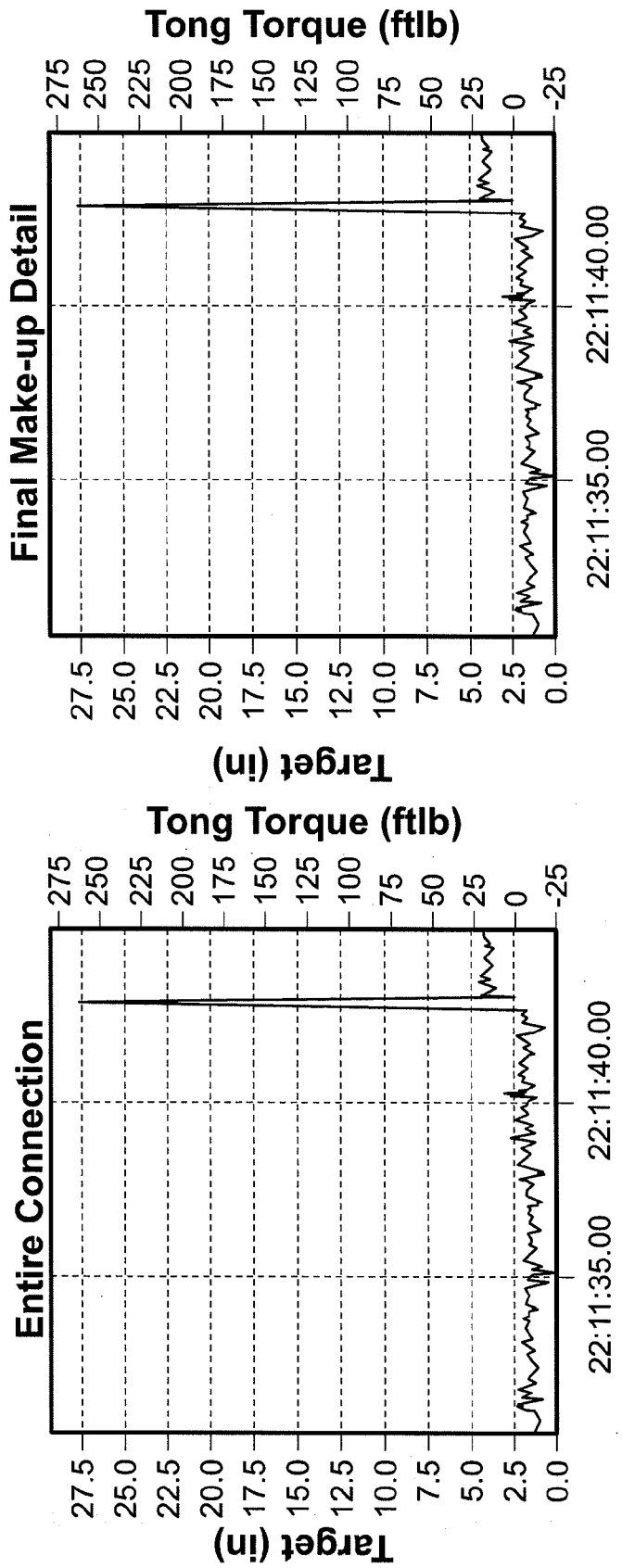
FIG. 4 is a diagram showing information for a joint certified by the method of FIG. 3.
Figure 4:
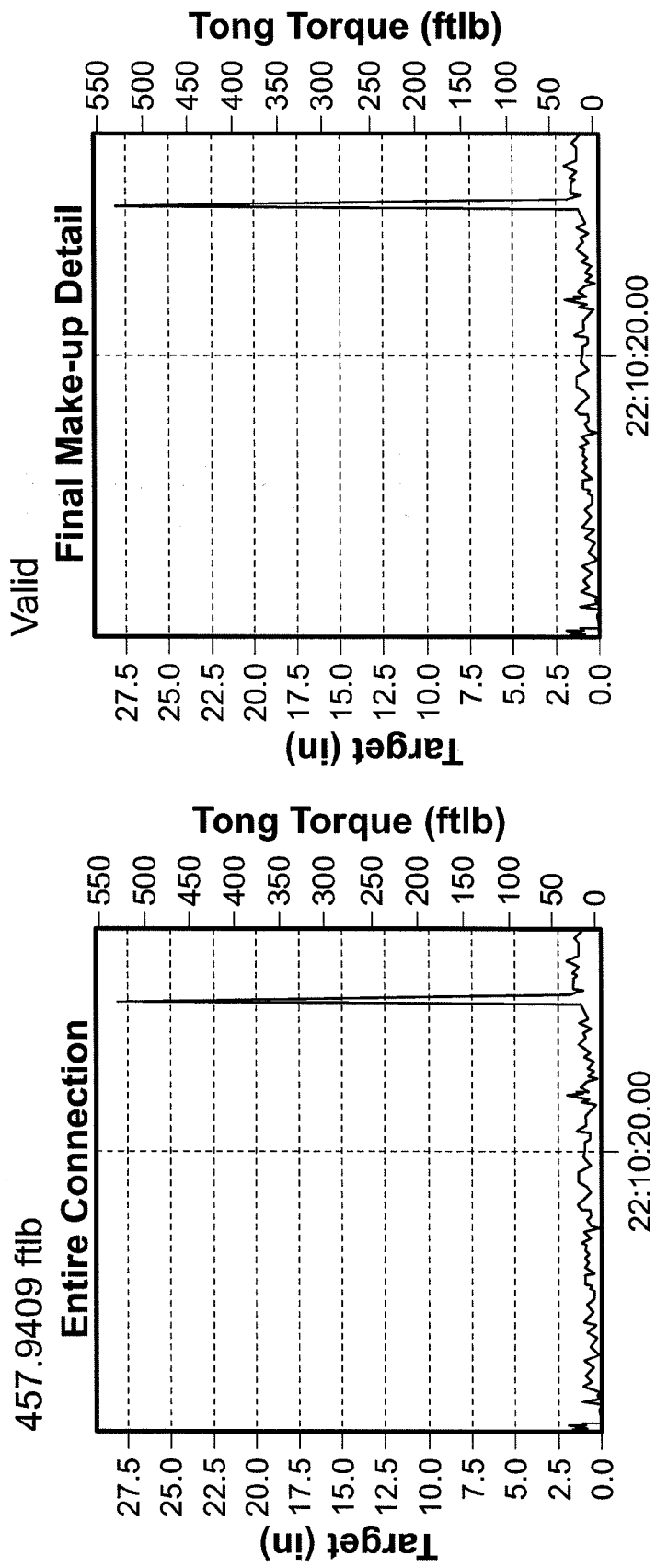

As shown in FIG. 4, a first rod 30 connects to a second rod 32. It can be appreciated that other types of elements such as tubing that have a threaded connection and are utilized in the oil industry may also be tightened and the connection verified and certified. Such a method also is within the scope of the present invention. Each of the rods includes a male connector 34 and a complementary female connector 36. The male connector 34 of the first rod 30 inserts into and connects to the female connector 36 of the second rod 32. The male connector 34 includes external threads 38 that mate with complementary internal threads of the female connector 36. The rods 30 and 32 include an elongated generally cylindrical rod body 40. The male connector 34 includes a first shoulder 40 while the female connector includes a second shoulder 44. When the rods 30 and 32 are connected, the first shoulder 42 and second shoulder 44 abut one another.

Figure 3:
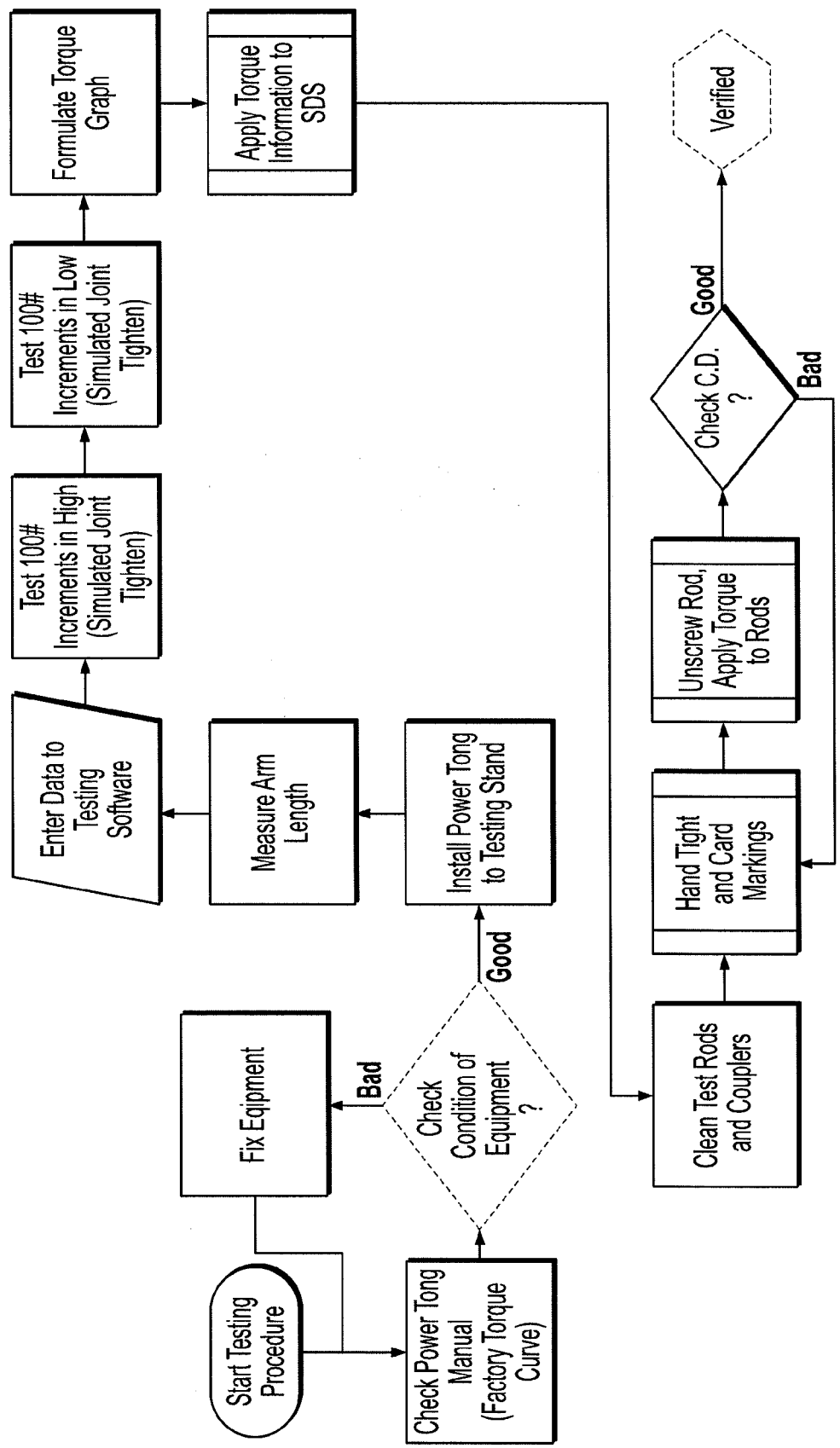
FIG. 3 is a flow diagram showing the steps for testing and certifying tightened joints according to the principles of the present invention.

Referring now to FIG. 3, the method for tightening and certifying that the connection is satisfactory and/or that the tightening equipment is properly calibrated and is satisfactory is shown in FIG. 3. This procedure generally begins with a system check of the tong and measurement equipment. If needed, repairs and adjustments are made until it is verified that the test equipment and tong are in good working order. The tong is then placed into the test stand and secured. The length of the tong arm is measured and entered to determine the moment arm used for calculating the torque load. Data regarding the tubing or rod and the tong is entered into the controller of the electronics housing 22. Specifications and tolerances may be entered or may be stored by the controller 22. The controller 22 may also have historical information that may be referenced if the particular tong and/or the rods or tubing have previously been certified. The equipment is then tested with torque applied in discrete increments for both high and low modes. A torque graph is automatically formulated for the particular tong and the particular rod or tube elements.

Figure 6:
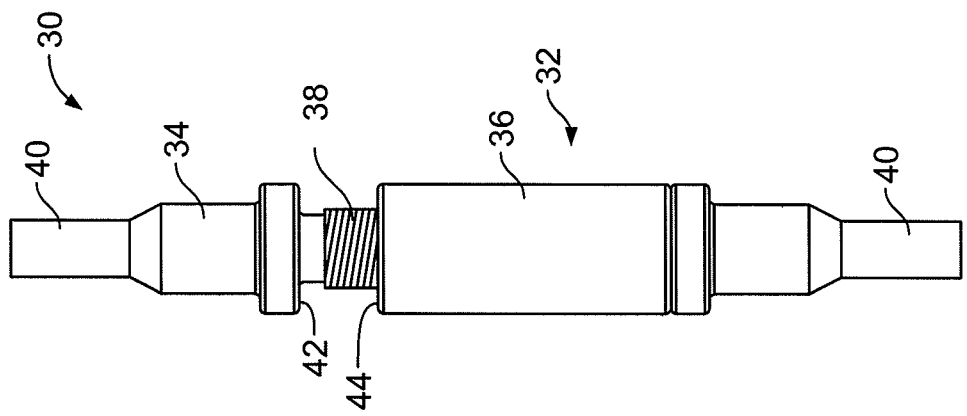
FIG. 6 is a side elevational view of a joint at a loosened position.
Figure 5:
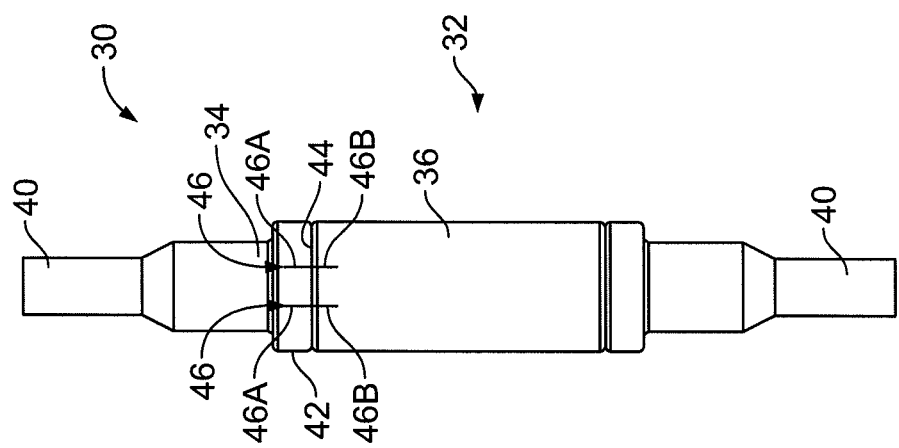
FIG. 5 is a side elevational view of a joint at a hand tightened first position.

When the setup of the test system 10 is complete, the elements themselves are cleaned. The threads are generally cleaned with a wire brush and/or other conventional cleaning devices and lubricant may be applied to the threads. When the connections have been cleaned, the elements 30 and 32 are hand tightened to a position such as shown in FIG. 5. In this position, the connections are not under torque but the first shoulder 42 and second shoulder 44 abut one another. The first shoulder 42 and the second shoulder 44 are marked with a pair of "hand tightened" marks 46 including first portions 46A that are on the first shoulder 42 and second portions 46B that extend onto the second shoulder 44. When marking is complete, the first rod 30 and the second rod 32 are loosened such as shown in FIG. 6.

Figure 7:
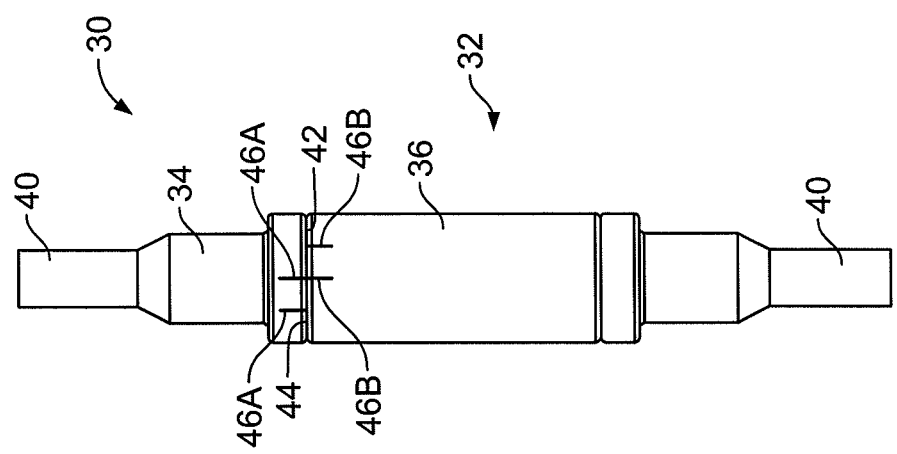
FIG. 7 is a side elevational view of a joint at a second position tightened to a predetermined specification.

From a loose connection, the two elements 30 and 32 are tightened by the system 10 with a specified torque applied. When the predetermined torque has been applied, the rod elements 30 and 32 are positioned such as shown in FIG. 7. The alignment between the marks 46A and 46B can then be compared to one another. The position of the markings 46A and 46B is observed and may be recorded. A gauge may be applied to determine the angular displacement beyond the hand tightened position. If the angular displacement is within a predetermined tolerance range, the joint is approved and the connection is verified. The system may provide a visual or audio indicator of acceptance. However, if the connection binds or if the distance does not meet the specifications, the joint may be loosened such as the position shown in FIG. 6. An alarm or other signal may be automatically generated if the connection is not verified. The elements 30 and 32 are then tightened again to the position shown in FIG. 5 and the shoulders 42 and 44 are marked. The connection is then loosened again, such as shown in FIG. 6 and torque is again applied to the elements 30 and 32, such as shown in FIG. 7. The process may be automatically repeated multiple times if needed. If after a predetermined number of attempts, a satisfactory torque and/or corresponding displacement are not achieved, the elements may be removed and it may be determined that one or more of the rod or tube elements 30 or 32 is unfit for use or that the tong 12 is not functioning properly or is not properly calibrated. If the standard is achieved, the connection can be certified and the tong can be certified.

As shown in FIG. 4, in addition to providing certification, information relating to the makeup of the joint and the graph of torque versus rotational distance or angular displacement as the elements are connected may be recorded and/or displayed. In this manner, a historical record is created and referenced for making decisions whether certain elements are fit for use or should be removed from service. The data may also be used in the case of later failures or to help determine which of the two elements or both elements must be replaced if the connection cannot be certified.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for certifying a joint between a first threaded element having a first shoulder and a second threaded element having a second shoulder, the method comprising:
   tightening to a first position at which the first shoulder abuts the second shoulder;
   making one or more marks aligned across the first element and the second element corresponding to the first position;
   loosening the connection;
   tightening to a second position complying with a predetermined tightening specification;
   verifying the distance beyond the marks for the first position is within acceptable tolerances;
   comparing connection information to historical information for determining whether the joint may be certified.

2. The method according to claim 1, wherein the predetermined tightening specification comprises a rotational distance.

3. The method according to claim 1, wherein the predetermined tightening specification comprises a torque.

4. The method according to claim 1, further comprising storing the information for each joint in a database.

5. The method according to claim 1, further comprising displaying parameters of each tightening operation.

6. The method according to claim 1, wherein the elements are tightened with a tong and an air brake.

7. The method according to claim 1, wherein the steps are operated by a control system.

8. The method according to claim 1, wherein the steps are automatically operated by a control system.

9. The method according to claim 1, comprising tightening to the second position for a predetermined number of attempts and if the distance falls outside the acceptable tolerances, indicating that the joint fails certification.

10. The method according to claim 9, wherein the tightening to a second position is automatically repeated if the distance between the marks fails to fall within the acceptable tolerances.

* * * * *